US008688268B2

(12) United States Patent
Samain et al.

(10) Patent No.: US 8,688,268 B2
(45) Date of Patent: Apr. 1, 2014

(54) DEVICE FOR DISPENSING A PREPARATION, WITH AUTOMATIC OR SEMI-AUTOMATIC ADJUSTMENT OF THE PROPERTIES OF THE PREPARATION BY MEANS OF AN INTEGRATED SENSOR OF THE SURROUNDINGS

(75) Inventors: Henri Samain, Bievres (FR); Jean-Francois Grollier, Paris (FR); Didier Candau, Bievres (FR)

(73) Assignee: L'Oreal, Paris (FR)

( * ) Notice: Subject to any disclaimer, the term of this patent is extended or adjusted under 35 U.S.C. 154(b) by 269 days.

(21) Appl. No.: 13/119,073

(22) PCT Filed: Oct. 23, 2009

(86) PCT No.: PCT/IB2009/054699
§ 371 (c)(1), (2), (4) Date: Aug. 9, 2011

(87) PCT Pub. No.: WO2010/046883
PCT Pub. Date: Apr. 29, 2010

(65) Prior Publication Data

US 2011/0288680 A1 Nov. 24, 2011

Related U.S. Application Data

(60) Provisional application No. 61/113,070, filed on Nov. 10, 2008.

(30) Foreign Application Priority Data

Oct. 23, 2008 (FR) ..................................... 08 57200

(51) Int. Cl.
*G06F 17/00* (2006.01)

(52) U.S. Cl.
USPC ............................ 700/233; 700/239; 700/240

(58) Field of Classification Search
USPC .................................................. 700/233, 239
See application file for complete search history.

(56) References Cited

U.S. PATENT DOCUMENTS 3,934,596 A 1/1976 Suntheimer et al.
4,962,910 A * 10/1990 Shimizu ........................ 250/372

(Continued)

FOREIGN PATENT DOCUMENTS

DE 100 16 078 A1 5/2001
DE 20 200 40 11 856 U1 12/2004

(Continued)

OTHER PUBLICATIONS

French Republic Preliminary Report for National Register No. FA 715504 FR 0857203 mailed Aug. 6, 2009.
French Republic Written Opinion for National Register No. FR 0857203 mailed Aug. 6, 2009.
International Search Report for International Application No. PCT/IB2009/054701 mailed Feb. 4, 2010.

(Continued)

*Primary Examiner* — Timothy Waggoner
(74) *Attorney, Agent, or Firm* — Oliff PLC

(57) ABSTRACT

A cosmetic or dermatological system includes a packaging and dispenser device containing one or more compositions from which the dispensed preparation is prepared, a surroundings sensor that is suitable for delivering at least information associated with a physical magnitude of the surrounding environment of the device, an adjustment system that is coupled to or suitable for coupling to the packaging and dispenser device, and that enables at least one characteristic of the dispensed preparation to be varied, and a processor for automatically controlling the adjustment system as a function of data delivered by the surroundings sensor or for informing the user, as a function of the data, about an action to be exerted on the adjustment system.

41 Claims, 3 Drawing Sheets

(56) References Cited

U.S. PATENT DOCUMENTS

| | | | | |
|---|---|---|---|---|
| 5,746,348 | A | 5/1998 | Bloom | |
| 5,785,960 | A * | 7/1998 | Rigg et al. | 700/239 |
| 6,371,451 | B1 * | 4/2002 | Choi | 261/26 |
| 6,595,389 | B2 * | 7/2003 | Fuchs | 222/38 |
| 6,769,580 | B2 * | 8/2004 | Muderlak et al. | 222/646 |
| 6,986,442 | B2 * | 1/2006 | Engel et al. | 222/63 |
| 7,247,140 | B2 | 7/2007 | Ophardt | |
| 7,850,051 | B2 * | 12/2010 | Py et al. | 222/207 |
| 2003/0064350 | A1 | 4/2003 | Rubinstenn et al. | |
| 2003/0069667 | A1 | 4/2003 | Dirksing et al. | |
| 2004/0133306 | A1 | 7/2004 | Schmid | |
| 2004/0188469 | A1 | 9/2004 | Lambrakis et al. | |
| 2005/0005678 | A1 * | 1/2005 | Duranton | 73/29.02 |
| 2006/0108247 | A1 | 5/2006 | Liechty et al. | |
| 2006/0258946 | A1 | 11/2006 | Hayano et al. | |
| 2008/0047972 | A1 | 2/2008 | Bartholomew et al. | |

FOREIGN PATENT DOCUMENTS

| | | | |
|---|---|---|---|
| EP | 2 081 668 | A | 7/2009 |
| FR | 2 807 346 | | 10/2001 |
| WO | WO 98/30189 | A | 7/1998 |
| WO | WO 02/094423 | A1 | 11/2002 |
| WO | WO 2006/044585 | A2 | 4/2006 |
| WO | WO 2008/046518 | A1 | 4/2008 |

OTHER PUBLICATIONS

Written Opinion for International Application No. PCT/IB2009/054701 mailed Feb. 4, 2010.

International Search Report for International Application No. PCT/IB2009/054700 mailed Feb. 4, 2010.

Written Opinion for International Application No. PCT/IB2009/054700 mailed Feb. 4, 2010.

Republic of France Search Report for National Registration No. FA 715505 FR 0857204 mailed Jul. 20, 2009.

French Republic Written Opinion for National Register No. FR 0857204 mailed Jul. 20, 2009.

International Search Report for International Application No. PCT/IB2009/054699 mailed Feb. 12, 2010.

Written Opinion for International Application No. PCT/IB2009/054699 mailed Feb. 12, 2010.

Republic of France Search Report for National Registration No. FA 715207 FR 0857200 mailed Jul. 20, 2009.

French Republic Written Opinion for National Register No. FR 0857200 mailed Jul. 20, 2009.

U.S. Appl. No. 13/119,065, filed Mar. 15, 2011.

U.S. Appl. No. 13/119,073, filed Mar. 15, 2011.

Mar. 28, 2013 Office Action issued in U.S. Appl. No. 13/119,065.

Oct. 11, 2013 Office Action issued in U.S. Appl. No. 13/119,065.

* cited by examiner

DEVICE FOR DISPENSING A PREPARATION, WITH AUTOMATIC OR SEMI-AUTOMATIC ADJUSTMENT OF THE PROPERTIES OF THE PREPARATION BY MEANS OF AN INTEGRATED SENSOR OF THE SURROUNDINGS

TECHNICAL FIELD

The present disclosure relates to dispensing a cosmetic or a dermatological preparation. More particularly, the present disclosure relates to dispensing a sun exposure preparation.

BACKGROUND

Cosmetics are often made available in numerous variants to enable adaptation to various situations.

Thus, sun exposure products, e.g., sunscreens, can be provided in several levels of potency (e.g., varying SPFs), containing varying quantities of active agents, for example, filters, to enable adaption to differing sunlight conditions.

Users of such products can be faced with issues of selection when deciding what product to acquire and/or use for any particular set of sunlight conditions (e.g., intensity, directness, exposure times, etc.) This can lead to hesitation in selecting one level or potency over another, because the user may know in advance that sunlight conditions will vary. The user may choose to acquire several different products of different potencies, but such a solution may not be desirable, at least because of the space occupied by such the products and their expense.

Another choice may be to use the product having the highest potency, but such a solution may not be desirable because using maximum protection when conditions do not require presents several drawbacks. For example, all or portions of the sunlight spectrum are substantially prevented from reaching the skin, so it may not tan, thereby not developing physiological transformations that would provide it with its own protection (e.g., melanin production.)

One potential solution could be to take advice from a specialist prior to exposure to sunlight during a particular time, or to take measurements from an appliance configured to measure light flux. Such solutions may not be desirable because the specialist or the appliance may have limited availability, and may not provide advice day after day. Furthermore, additional attention may be exercised by a user when transforming the advice received into a selection of a product having the desired potency. For example, conversion tables may be provided, thereby making such selections unattractive and prone to error.

Issues relating to selecting products having different potencies also present themselves when conditions change, as for example, with products that provide protection against drying, high temperature, or low temperature.

Furthermore, for various reasons, numerous care products may be available in only one or several potencies, for example, as a result of manufacturing and/or economic considerations. Although manufacturers may desire to make a wide variety of products available to satisfy the desires of many users, they may determine, e.g., based on economic reasons, to restrict themselves to a smaller number of available products.

It is known that ultraviolet (UV) filters can be effective in protecting the color of the hair, particularly when used in suitable quantities and concentrations. Such concentrations can give create a rather "heavy" feel, i.e., an undesirable feeling for the user following application of the product. It is thus undesirable to use high concentrations if the amount of sunlight does not warrant use of such concentrations. Users may also choose to use products with more moderate concentrations of protective active agents, e.g., to limit the undesirable "heavy" feeling following application. However, such concentrations may provide undesirably low levels of protection to higher levels of sunlight, thereby potentially resulting in damage, possibly irreversible, to the coloring and state of the hair.

It is also known that hair is sensitive to the electrical conductivity of the air. If the air has very low electrical conductivity, for example, in dry air, then the hair may become charged with static electricity, making brushing or combing the hair difficult or even impossible. Product manufacturers have been hesitant to create products to combat static electricity because, with regard to the hair, the phenomenon is rather rare. Further, while it may be possible to incorporate active agents in conventional products such as, for example, shampoos, to combat the effect of static electricity, such agents again can result in an undesirable "heavy" feel. Therefore, it may be undesirable to provide such agents to the hair when the ambient conditions are not such that the presence of such agents is desirable.

Issues related to selecting levels of potency for a product may be more difficult where ambient conditions vary in unforeseen ways over time. For example, while it is sometimes possible to predict how the level of sunlight is going to vary, it is more difficult to predict how temperature, humidity, or wind speeds may vary over time.

Thus, selecting a product may be a complicated exercise and may result in errors. This may be particularly true when precipitation or sudden changes in temperature or humidity occur during the course of a particular time period. Such variations may harm the quality of products that have been applied and may reduce their effects, particularly because it is not uncommon for a user to be taken by surprise by such changes and thus to have incorrect and/or undesirable levels of protection and/or cosmetic effect. For example, a person with a sophisticated hairdo (e.g., voluminous) may desire such a hairdo to maintain its shape, and may therefore apply a large amount of hair spray. However, large amounts of hair spray can result in poor or less than desirable visible appearance and feel. Moreover, such an application may prove undesirable if the weather remains dry and settled.

US Patent Publication No. 2003/0064350 describes a method in which information is obtained concerning a person, e.g. data concerning age, skin type, or hair type, and provides advice about the use of products as a function of the person's location.

U.S. Pat. No. 4,962,910 describes a device including an UV radiation sensor and calculation means that act as a function of skin type and the sunscreen product used to trigger an alarm when the received dose of UV may cause erythemia.

US Patent Publication No. 2005/0005678 describes a packaging and dispenser device including a processor capable of receiving a weather forecast in order to take said forecast into consideration when recommending action to be taken by the user. That application also describes a hygrometer configured to display a recommendation concerning the frequency with which a substance should be applied or the desire to change the nature of the substance used. The processor may receive information delivered by a humidity sensor, and also, where desired, from other sensors, e.g. a sensor configured for contact with the skin, a temperature sensor, or a solar radiation sensor.

Packaging and dispenser devices are also known that may enable the sunscreen index in the delivered preparation to be adjusted manually, by means of a slider provided on the stopper.

US Patent Publication No. 2006/0108247 A1 discloses a packaging and dispenser device enabling the relative proportions of two substances to be varied manually as a function of the properties desired for the preparation.

U.S. Pat. No. 7,247,140 describes a dispenser provided with a UV radiation sensor and means for indicating that the received UV level is above a predefined threshold.

Application DE 20 200 40 11 856 discloses a packaging and dispenser device having two or more cartridges containing different compositions and means for mixing the compositions. The device also includes adjustment means that may enable the mixing of the compositions to be controlled as a function of information provided by a sensor that is for application to a region to be treated, e.g. for the purpose of determining moisture content.

US 2006/0258946 A1 describes a container provided with a device such as a skin moisture sensor or various other sensors.

SUMMARY

Exemplary embodiments of the present disclosure provide a cosmetic or dermatological system comprising:

- a packaging and dispenser device containing one or more compositions from which the dispensed preparation is prepared;
- a surroundings sensor that is suitable for delivering at least information associated with a physical magnitude of the surrounding environment of the device;
- an adjustment system that is coupled to or suitable for coupling to the packaging and dispenser device, and that enables at least one characteristic of the dispensed preparation to be varied; and
- means for acting automatically on the adjustment system as a function of data delivered by the surroundings sensor or for informing the user, as a function of said data, about an action to be exerted on the adjustment system.

The present disclosure makes it possible to automatically or semi-automatically modify a property of the dispensed preparation as a function at least of information delivered by the surroundings sensor and associated with at least one physical magnitude of the surrounding environment of the system.

According to various embodiments, the preparation is delivered in non-gaseous form, for example, in fluid form such as a liquid, cream, gel, suspension, emulsion, or flowable powder.

The term "automatic" should be understood as meaning that adjustment is performed without the user acting on an adjustment member. The term "semi-automatic" should be understood as meaning that adjustment requires the user to act on an adjustment member. For example, the system displays or announces an adjustment value and the user actuates an adjustment member of the system as a function of the information.

The system may be portable and handheld, i.e., it may be held in one hand and actuated by one hand.

The adjustment system makes it possible to vary the concentration of at least one active agent within the delivered preparation as a function at least of information delivered by the surroundings sensor. Thus, when using the system, the preparation presents a concentration of a primary or a secondary active agent that is optimized for the moment of use.

The term "primary active agent(s)" is used to designate the active agent(s) imparting the main effectiveness to a preparation, e.g. wetting agents for a shampoo. The term "secondary active agent(s)" is used to designate the active agent(s) playing a role in making the preparation attractive; for example, with a shampoo, agents providing fragrance or controlling rheology.

In exemplary embodiments, the concentration in a primary active agent may be varied continuously between two values, for example between 0 and $C_{max}$.

By means of the present disclosure it becomes possible, merely by exposing the surroundings sensor to conditions at that moment, and by causing the preparation to be delivered, to obtain a delivered preparation that is optimized, i.e. that contains the primary or secondary active agent at a concentration that is ideal for the moment of use. If the system according to exemplary embodiments of the present disclosure is used at another moment, said system may, as a function of the new conditions of that moment, come to a different adjustment of the concentration for the active agent.

Optionally, the cosmetic or dermatological system is arranged to communicate with an expert system suitable for processing the information coming from one or more sensors of the surroundings. This makes it possible to simplify the system according to exemplary embodiments of the present disclosure, which may then include minimal or no computation means.

The energy for powering the surroundings sensor and the adjustment system may be provided by an internal electrical energy source, by ambient light, or by the user making use of an energy converter system, e.g. an electromechanical mechanism actuated by the user.

The energy for dispensing the preparation and making it uniform where desired may be provided by the user acting on an energy converter or acting directly, e.g. by pressing on one or more walls of the device. The energy may also be provided by an internal or an external electricity source, e.g. by transforming ambient light into electricity via photovoltaic cells.

The present disclosure applies to preparing sunscreen preparations. Under such circumstances, the surroundings sensor may be a UV radiation sensor. The preparation dispensed by the device may be a sunscreen preparation in which the protective strength is adjusted automatically by means of the present disclosure as a function of UV irradiation, by automatically metering out one or more UV filters as a function of the intensity of the UV radiation.

The surroundings sensor may be a sensor sensitive to ambient light receiving light that is not emitted by a light source belonging to the system. The sensor is not a skin color sensor. The system may comprise an additional device or sensor to make skin color measurements, for example to determine a skin phototype.

The system may adjust automatically the protective strength not only as a function of the UV radiation but also a function of the phototype. The present disclosure applies also to making preparations against the skin drying out. Under such circumstances, the surroundings sensor may include at least one of a temperature sensor, a humidity sensor, and a light flux sensor.

The preparation dispensed by the device may also be a skin care product in which a property is adjusted automatically as a function of the ambient temperature, and under such circumstances, the surroundings sensor includes a temperature sensor, for example.

The present disclosure also applies to making preparations that provide protection against wintry weather. Under such circumstances, the surroundings sensor may include at least one of a temperature sensor, a humidity sensor, and a light flux sensor.

An advantage of the present disclosure is to make it possible to make preparations in a variety of strengths, whereas factory-prepared products are made available in a variety of strengths rarely, if at all.

For example, antiperspirants, deodorants, and fragrances are products that are often available in a single strength only. By means of the present disclosure, the content of an antiperspirant agent, e.g. an aluminum salt, an antibacterial agent, or a fragrance may be adjusted depending on outdoor conditions. The surroundings sensor may include at least one of a temperature sensor, a humidity sensor, and a light flux sensor, and naturally the activity of the preparation should be strengthened in the event of high temperature or humidity, or depending on light intensity. Since these conditions vary from one day to another, the present disclosure is very useful.

Products for providing protection against mosquitoes are likewise often made available in a single strength only. In this context also, the content of the active agent, e.g. N,N-diethyl-meta-toluamide (DEET), may be adjusted by means of the present disclosure depending on the outside conditions, by means of a surroundings sensor including a temperature and/or humidity sensor.

Products for washing the body and the hair are themselves likewise often available in a single strength only. By means of the present disclosure, the content of the active agent, e.g. a wetting agent, may be adjusted depending on outside conditions, in particular temperature or humidity.

Preparations for washing, for care purposes, for makeup, for shaping the hair, may be improved by means of the present disclosure by using a surroundings sensor that measures temperature or humidity, thereby adjusting the strength of a secondary active agent, e.g. a fragrance that is incorporated in the preparation.

Preparations for the hair, for washing, for care purposes, and for shaping the hair may be improved by means of the present disclosure by using at least one surroundings sensor that measures light levels and that makes it possible to adjust the level of a secondary active agent constituted by a sun protection filter. The present disclosure makes it possible, by using a light sensor as surroundings sensor, to use a hair preparation in which the quantity of protective active agent against the sun is adjusted to conditions at the moment of application. A starting compositions may contain a sun protection filter, amongst other active agents. By way of example, it is possible to provide the system according to exemplary embodiments of the present disclosure with a humidity and/or temperature sensor in order to incorporate a weighting anti-static active agent in a hair treatment preparation, should that be felt to be necessary. The term “starting composition” shall be understood to mean a composition as originally supplied to a reservoir and configured for inclusion and/or processing into a preparation. Such starting compositions may comprise active agents, neutral agents, and/or any combination thereof as desired. A composition may include a fluid, e.g. liquids, creams, gels, suspensions, emulsions, flowable powder etc., and/or a solid, e.g., a stick, etc.

The packaging and dispenser device may have two reservoirs containing two compositions, also referred to as starting products, for mixing together to form the delivered preparation, the adjustment system acting as a function at least of data delivered by the surroundings sensor to modify the ratio of one starting composition relative to the other in the dispensed preparation.

The device may have two reservoirs containing different starting compositions, the adjustment system being arranged to dispense one of the starting compositions selectively. For example, the starting compositions contain different active agents and/or different contents. In this example, the starting compositions may be dispensed without mixing the starting compositions together.

The physical magnitude may include the intensity of UV radiation; the temperature or the pressure of the atmosphere; an indicator of the presence of particles, e.g. pollen, biological compounds; animal species, e.g. mites.

The energy required to dispense the preparation may be provided by the user exerting an action on the device, in particular pressing on a wall thereof.

The device may include one or more removable reservoirs containing the starting composition(s) from which the dispensed preparation is made.

The cosmetic or dermatological system may include a user interface enabling the user to input at least one of skin type, hair type, age, and/or activity, and the system may take account of the information input in this way, to calculate the adjustment to be made. The user interface may optionally be incorporated in the packaging and dispenser device.

The adjustment system may include a pinch valve or at least one rotary cam, amongst others adjustment means.

The packaging and dispenser device may include an activation chamber in which an active agent in its deactivated state is exposed to a stimulus, causing it to pass into an activated state.

In an exemplary embodiment, the device comprises at least two reservoirs containing compositions to be delivered with an adjustable ratio. The reservoirs are defined by flexible walls so a user may dispense the compositions by pressing against the walls.

The system may comprise a head comprising two channels in fluid connection with the two respective reservoirs. The channels may comprise flexible tubes and the system may comprise actuators for defining the tube and change the internal cross section and the flowrate of fluid flowing therein. During actuation of the system, the channels may be opened at the same but with different section so the fluid mix in various ratios. In a variant, the channels are opened in sequence for a predetermined time so that the quantity of each fluid corresponds to a predetermined ratio with respect to the overall product dispensed.

The present disclosure also provides a method comprising the step consisting in:

- automatically or semi-automatically modifying the adjustment of a system as defined above, as a function of at least one condition of the surroundings measured by the sensor.

The present disclosure also provides a method of preparing a cosmetic or a dermatological preparation, the method comprising:

- taking a measurement of at least one condition of the surroundings by means of a surroundings sensor; and
- automatically or semi-automatically adjusting a characteristic of the delivered preparation as a function at least of the measurement taken.

For example, the measurement is taken and the adjustment is performed within a hand held device, the device incorporating at least a surroundings sensor and an adjustment system. In a variant, the system includes a packaging and dispenser device in the form of a handpiece and a base station on which the handpiece may rest when not in use. The handpiece may contain the reservoir(s) containing the starting compositions and a means of dispensing the preparation having the desired characteristics, e.g. by mixing together desired proportions of the starting compositions. The handpiece may also contain an adjustment member, e.g. a valve, that is actuated by the base station before the handpiece is detached therefrom. The base station may include an actuator and a mechanical transmission leading to the adjustment member of the handpiece, so as to position the valve in the position corresponding to the desired adjustment.

The adjustment system may be configured to maintain an adjustment following dispensing of the preparation, and such an adjustment may be maintained until new information from the surroundings sensor is received by the processor.

The system may include a closure cap configured to substantially cover at least a top portion of the packaging and dispenser device. The closure cap may also be configured to actuate a switch, actuation of the switch causing a signal to be sent to the processor indicating a cap open or a cap closed status. Opening the closure cap, may thereby cause operation of the surroundings sensor and/or the processor In some embodiments, the system may include a system status indicator, which may be an LED. The status indicator is configured to indicate at least one of the following statuses, a ready to dispense status, an obtaining surroundings data status, and a composition level low status.

In some embodiments, reservoirs are formed from a flexible and/or supple material and at least one internal dividing wall.

In some embodiments, the processor may be programmed to determine an adjustment based on a linear relationship with a voltage provided by the surroundings sensor. The processor may also be re-programmable via one or more interfaces.

In some embodiments, the packaging and dispenser device may comprise a head unit and a body unit. Such a head unit may be detachable and/or reusable. The body unit may comprise the one or more starting compositions, while the head unit may comprise at least one of the adjustment system and the processor.

In some embodiments, the system may comprise a measurement actuator, for example mounted on the head unit and/or the body. The measurement actuator may be configured to cause operation of at least one of the processor and the surroundings sensor to obtain the information.

Aside from the structural arrangements set forth above, the present disclosure could include a number of other arrangements, such as those explained hereinafter. It is to be understood that both the foregoing description and the following description are exemplary.

BRIEF DESCRIPTION OF THE DRAWINGS

The accompanying drawings, which are incorporated in and constitute a part of this specification, illustrate a number of exemplary features of a non-limiting embodiment of the present disclosure and together with the description, serve to explain the principles of the present disclosure. In the drawings.

MORE DETAILED DESCRIPTION

Figure 1:
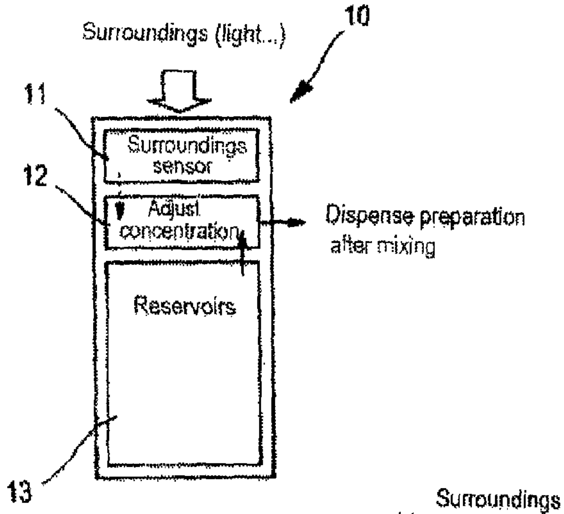
FIGS. 1 to 3 are diagrammatic views showing exemplary cosmetic or dermatological systems according to exemplary embodiments of the present disclosure.

FIG. 1 shows an exemplary system 10 according to exemplary embodiments of the present disclosure. System 10 may comprise one or more surroundings sensors 11, an adjustment system 12, and one or more reservoirs 13 containing starting compositions for mixing and or dispensing in desired manner to obtain a final preparation to be dispensed having the desired properties. In some embodiments, one or more sensors 11, adjustment system 12, and reservoir(s) 13 may be incorporated within a packaging and dispenser device. The term "starting composition" shall be understood to mean a composition as originally supplied to the reservoir and configured for inclusion within a preparation. Such starting compositions may comprise active agents, neutral agents, and/or any combination thereof as desired.

Reservoir(s) 13 may be in the form of removable refills or may be refillable. Where desired, the reservoir(s) are incorporated in a packaging and dispenser device that may be fastened in removable manner on a base station that contains surroundings sensor(s) 11 and all or some of adjustment system 12 as well as processor means for processing the data delivered by surroundings sensor(s) 11 and for acting on the adjustment system.

Surroundings sensor(s) 11 may be mounted to remain on system 10 substantially preventing surroundings sensor(s) 11 from being replaced or removed. Alternatively, surroundings sensor(s) 11 may be mounted in removable manner on system 10, thereby making it possible, for example, to replace a surroundings sensor 11 that is sensitive to certain conditions with another sensor, e.g. a surroundings sensor 11 that is sensitive to other conditions, possibly as a function of the starting compositions used.

In exemplary embodiments, e.g., as shown in FIG. 1, system 10 may be configured to function independently, i.e., no information exchange with an external expert system is involved in order for system 10 to function.

Figure 2:
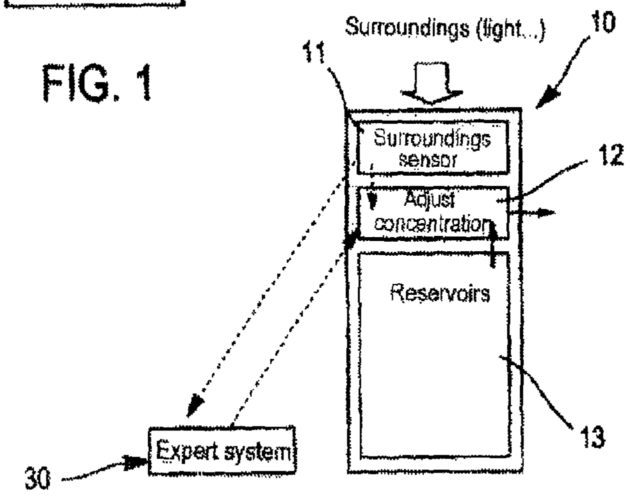

In exemplary embodiments, e.g., as shown in FIG. 2, system 10 is arranged to exchange data with an expert system 30 that is external to system 10, by any wired or wireless communication means. Expert system 30 may process some or all of the data coming from sensor(s) 11 of the surroundings. System 10 may possibly choose to use the external expert system 30 automatically, when system 10 detects that said external expert system is operational.

In some embodiments, characteristics of the preparation may be adjusted independently of user preferences, or, alternatively, by taking into account user preferences, e.g. skin type, hair type, user age, user skin color, etc.

Surroundings Sensor

The system according to exemplary embodiments of the present disclosure includes one or more surroundings sensors 11. Surroundings sensor(s) 11 may be selected from sensors of humidity, light (incorporating all or part of the visible spectrum, ultraviolet B (UVB), ultraviolet A (UVA), infrared (IR)), temperature, electrical conductivity, magnetic and electric field, pressure and/or altitude, wind, precipitation, fog, ionization, electromagnetic radiation (X rays, gamma rays), ionizing radiation, liquid or solid particles, transparency of the air, a gaseous chemical compound (e.g. $CO_2$, CO, $N_2$, $O_2$, $O_3$, $NO_2$, $NO_3$), or a particular atom (e.g. sulfur). Further, surroundings sensor(s) 11 may react in the presence of pollen or mites and/or other insects.

The term “surroundings sensor” is used to mean a sensor that is not for measuring the characteristics of the skin or the hair, and that is designed to measure a magnitude associated with the environment in which people are immersed, more particularly, where system 10 is present. For example, measurements of a characteristic of the surrounding air or of exposure to solar radiation may be taken by surroundings sensor 11. Such sensors may measure a characteristic of the surrounding air, such as, for example, ionization.

In embodiments, surroundings sensor may be located on a top portion (relative to the ground) of system 10. For example, where surroundings sensor 11 is configured to measure UV radiation, light from the sun and/or sky may impinge directly upon surroundings sensor 11 by locating surroundings sensor 11 in a desirable location. This may enable an improved measurement for the level of UV radiation for example.

Surroundings sensor 11 is thus something other than a sensor of the moisture or the color of the skin or the hair and it is not designed to be put into contact with the skin or the hair when taking a measurement. In other words, physical magnitudes measured by surroundings sensor 11 are not measurements of elements on a body of a user (e.g., skin color, hair color, etc.) When measuring humidity or temperature, surroundings sensor 11 may be internal to the system and, for example, situated behind a wall of a housing of the packaging and dispenser device or of a base station.

System 10 may operate with a simple surroundings sensor 11, which sends its data to adjustment system 12 without any other processing and/or transformation. Adjustment system 12 prepares the adjustment as a function of received data and the mixing and the delivery of the mixed preparation take place only if the user causes delivery to take place, e.g. by pressing the wall of reservoirs 13 of the packaging and dispenser device.

In some embodiments, the system operates with two or more surroundings sensors 11, which may send data to adjustment system 12. Adjustment system 12 may process various data in various ways, e.g. by adding signals. This may be beneficial, for example, to a system according to exemplary embodiments of the present disclosure delivering a preparation against skin drying, and making use of a light and temperature surrounding sensors. Signals from the light and temperature surrounding sensors may be added together so that system 10 responds in accordingly if either light or temperature, or both change.

In some exemplary configurations of system 10 according to embodiments of the present disclosure, a difference between signals coming from two surrounding sensors 11 may be determined. For example, this may be beneficial to a system that delivers a preparation protecting against insects (e.g., mosquitoes). In such an embodiment, system 10 may include a light sensor and a humidity sensor. The content of the anti-mosquito agent in the preparation as delivered may decrease with increasing intensity of light and may further increase with increasing humidity.

System 10 may also have two or more surroundings sensors 11 associated with respective different active agents, e.g. contained in respective separate reservoirs 13. In such an embodiment, the amount of each active agent present in a preparation to be dispensed may depend on one or more surroundings sensors 11. For example, each active agent has a content in the delivered preparation that is associated with data delivered by a surroundings sensor 11 that is specific thereto.

Figure 3:
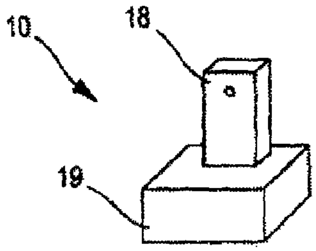

FIG. 3 shows the an exemplary system 10 according to embodiments of the present disclosure. System 10 may include a packaging and dispenser device in the form of a handpiece 18 that may be detached temporarily from a base station 19. Base station 19 may comprise the surroundings sensor(s) 11 and an actuator for acting on a valve placed in handpiece 18 when the handpiece 18 is placed on base station 19. Thus, when handpiece 18 is removed from base station 19, handpiece 18 may preserve any adjustment performed by base station 19 (e.g., valve manipulation). Where desired, base station 19 may receive, either successively or simultaneously, a plurality of different handpieces 18 containing one or more different starting compositions. Base station 19 may be arranged to identify the packaging and dispenser device that is fitted thereon, e.g. using a radiofrequency identification (RFID) chip, electric contacts, an optical reader, a mechanical feeler, or other suitable devices.

Signal Processing

System 10 includes means for acting on the adjustment system 12 based on data from the surroundings sensor(s) 11. These means may include processing means which perform various kinds of processing, which may be complex to a greater or lesser extent and may be implemented in analog or digital manner. The means used may be incorporated entirely in system 10, e.g., incorporated entirely in the packaging and dispenser device. Alternatively, all or some of the processing of the signals delivered by the surroundings sensor(s) 11 may be implemented at an expert system 30 that is external to system 10 or external to the packaging and dispenser device.

The means for acting and/or processing means may comprise a microprocessor and/or microcontroller, a specialized integrated circuit, electronic comparators, transistors, diodes, amplifiers, and/or any other suitable digital or analog electronic components configured for processing. For example, the means for acting and/or processing means may comprise a circuit including an i386 architecture processor, a RISC processor, and/or other components configured to cause execution of instructions.

The signal delivered by a surroundings sensor 11 may be integrated over time, or subjected to other processing, e.g. averaging or processing by a function seeking to correct or to create non-linearity.

The signal may be analyzed to determine desired information therefrom. For example, the signal may be analyzed to determine whether system 10 is in an indoor space or in an outdoor space. In particular, to perform the analysis, a spectrum or part of a spectrum may be compared with a plurality of typical spectra.

As the data to be taken into account, system 10 may select values (e.g., instantaneous extreme values) provided by a surroundings sensor 11, for example, as observed during a predefined period of time, e.g. a maximum or minimum value obtained during the day.

In some embodiments consistent with the present disclosure, system 10 may include a light sensor as a surroundings sensor 11. When the light sensor does not detect UV light, system 10 may determine that it is placed inside a structure or light shielded space (e.g., a building or dwelling). As a result, it may either propose (e.g., via a display and/or audible signal) that the user take system 10 outside to obtain a measurement. Alternatively, system 10 may perform a mathematical transformation on the value from the sensor to render a result more closely representing outdoor light. Where the light sensor detects a sudden change in light, and detects UV light, system 10 may determine that it has been moved from one location to another. As a result, it may choose to make the adjustment on the basis of the highest value received from the light sensor, for example corresponding to the new location. System 10 may include a user interface making it possible to input user preferences, and a network interface making it possible to receive data from an external source. For example such a source may be a network (e.g., a telephone network, a local area network, a wide area network, the Internet) and/or an appliance (e.g., a computer, a mobile telephone, a domestic or regional metrological station, or a personal digital assistant (PDA)).

System 10 may include one or more additional sensors 980, for example, a phototype and/or body characteristic sensor that are not surroundings sensors 11. In such embodiments, for example, a body characteristic sensor may be provided for measuring a moisture level or the color of the skin, and/or hair color, for example. In such embodiments, it may be possible for system 10 to take such additional data into account. For example, where a skin measurement has been taken by a body characteristic sensor, and a UV sensor indicates a particular UV radiation level, system 10 may determine based on a user's skin color how protection to provide in the form of sun filters in the preparation to be dispensed. In other words, based on natural protections provided by melanin present in a persons skin, system 10 may be enabled to compensate thus providing a more tailored preparation for dispensing.

Additional sensors 980 may be provided with an internal or external light source for purposes of taking measurements. Such a light source may not be activated during operation of surroundings sensor 11, to enable accurate measurement and to conserve power, for example.

In some embodiments, the user interface may enable notification to system 10 as to whether it is indoors or outdoors, to inform system 10 of the type of skin of the person receiving the preparation, and to select an operating mode, e.g. manual or automatic adjustment of the concentration of active agent, among other things.

System 10 may include an internal clock in addition to surroundings sensor(s) 11. The clock may enable system 10 to determine the amount of light that may be present or forthcoming, for example, based on a date and time. Where a UV sensor is provided for a surroundings sensor 11, a value associated with UV radiation may be present and the clock may indicate a particular time (e.g., that it is early in the day) System 10 may take such factors into account when adjusting a protection index of a preparation to be dispensed, by, for example, calculating an index that is adjusted (e.g., higher than the index corresponding to the measured value). In another example, where the clock provides data indicating it is later in the day, system 10 may take this into account, so as to provide a protection index that is lower than the index corresponding to the measured value of UV radiation. One of ordinary skill in the art will understand that other compensations based on data provided may be undertaken so as to provide a desirable preparation to be dispensed. Any such compensations are intended to fall within the scope of the present disclosure.

Dispensing

The packaging and dispenser device of a system according to exemplary embodiments of the present disclosure may include a plurality of reservoirs 13 storing contents (e.g. liquids, powders, crèmes, etc.) that may be mixed in varying proportions, based on data provided by one or more surroundings sensor 11. For example, the packaging and dispenser device may include two reservoirs and adjustment system 12 may act by modifying the flow rate (e.g., pump and/or valve manipulation) of the composition coming from at least one of the reservoirs.

In some embodiments, at least one reservoir 13 associated with a system 10 may contain an inert or "neutral" starting composition while other reservoirs 13 may contain starting compositions that are enriched with one or more active agents. Such a configuration may enable varying a concentration of active agents in a dispensed preparation, e.g., as a function of the data provided by surroundings sensor(s) 11.

A flow rate of the composition that comprises an active agent may be adjusted by system 10 prior to being mixed with the inert composition, so as to obtain the desired concentration of active agent in the mixture. To vary the flow rate, it may be possible to act on a flow section available to the composition, e.g., by squeezing a flexible duct with a desired force and/or by moving a valve needle in a flow channel of the fluid. Such variances in flow rate may be performed by a movable part of adjustment system 12, for example a part configured to move in translation and/or in rotation and/or in some other movement, e.g. being driven by a motor, by a magnetic field, and/or by an electrical field, among others.

In exemplary embodiments of the present disclosure where the packaging and dispenser device includes two reservoirs, a system of pistons configured for user actuation may be provided, for example to deliver the compositions. Adjustment system 12 may act on the stroke available to one or both of the two pistons so as to vary the relative proportions of the compositions.

In some embodiments of the present disclosure, it may be desired to act on a flow rate of one or more pumps to vary the content of active agent in the dispensed preparation. The pump may act, for example, to take the active agent from the corresponding reservoir 13 and provide it to an outlet associated with the packaging and dispenser device.

The packaging and dispenser device may have more than two reservoirs 13, and adjustment system 12 may adjust the flow rate of all or some of the starting compositions coming from each reservoir 13 in order to provide a preparation having desired concentrations of one or more active agents.

In some embodiments of the present disclosure, the packaging and dispenser device may be configured to perform volume metering by allowing a given volume of each of the starting compositions to pass, either in succession or simultaneously, into a mixing chamber, and/or to the outside via an outlet.

In some embodiments of the present disclosure, a form of energy may be used to activate an initially deactivated active agent that is contained in a starting composition. Such an activation may take place based on information provided by one or more surroundings sensors 11. For example, it is possible to heat an active agent that is meltable, such as a wax, or an active agent that is grafted on a thermolabile function, or an active agent that is held captive in a meltable active agent. It is also possible to irradiate a photosensitive compound, such as an active agent grafted on a photolabile chemical function. One of ordinary skill in the art will recognize that other such activations may be implemented without departing from the scope of the present disclosure.

In some embodiments, adjustment system 12 may act in an on/off manner (i.e., either active or inactive) to activate the active agent, or it may act in gradual manner (e.g., linear activation over time). Further, in some embodiments, the active agent may be activated while dispensing the preparation, for example, by causing the active agent to pass through an activation chamber. Alternatively, the active agent may be activated in a fixed or variable predefined quantity of the preparation, prior to it being dispensed by the packaging and dispenser device. For example, a desired quantity of fluid containing a deactivated active agent is taken to the outlet via an activation chamber. Before dispensing, the device may deliver the energy for activating the deactivated active agent. Only the active agent present in the active agent chamber may then be activated based on its isolation from reservoir 13.

Thus, the active agent remaining in reservoir 13 remains unactivated. On each utilization, the degree of activation of the active agent may be different, depending on the data provided by surroundings sensor(s) 11.

Figure 4:
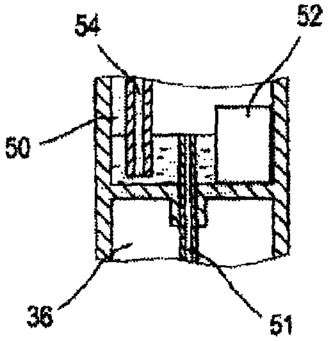

One exemplary device for causing a starting composition to enter an active agent chamber is shown at FIG. 4. The device may include one or more flexible walls on which the user may press so as to cause the composition to rise from a reservoir 36 into the activation chamber 50, e.g. by means of a dip tube 51. An activation device 52 may be located within or in proximity to activation chamber 50 to cause activation of the active agent. After activation, the composition may be taken from the active agent chamber 50 by any means, e.g. by pumping, pressure differential (e.g., generated by the user in the active agent chamber), pouring, or via an applicator, among others. In the example shown, the composition is taken after activation by means of a dip tube 54.

In some embodiments, a packaging and dispenser device is provided including a reservoir 13 that is surmounted by a small chamber for receiving a certain quantity of composition when the user presses reservoir 13. A dip tube connects the reservoir and the chamber. A heater (e.g., a resistive heater) may constitute the activation device and may surround or be in proximity to the chamber. The heater may be connected to a supply of electricity (e.g., a battery placed under the main reservoir), for example. Power delivery to the heater may be controlled by an assembly formed by a UV sensor and an operational amplifier, for example.

The reservoir may then be filled with a fluid composition containing, for example, a meltable active agent. If the sensed UV radiation level is relatively high, the heater may be actuated to cause the temperature of the content of the activation chamber to increase, e.g. by an amount lying in the range of 3° C. to about 15° C. As a result, the meltable active agent present in the composition within the chamber, is melted based on the increase in temperature. In some embodiments, the user may then turn the packaging and dispenser device upside-down, allowing the quantity of composition present in the activation chamber to be delivered.

In embodiments where a plurality of starting compositions are mixed together, the packaging and dispenser device may be provided with at least one mixing chamber that makes it possible to combine the active agents prior to dispensing (e.g., to improve uniformity of the mixture). In some embodiments, mixing may take place at an outlet of the packaging and dispenser device. The packaging and dispenser device may include a stirrer member for stirring the mixture before it is dispensed, e.g. a ball. The device may also include a dispenser endpiece including baffles to cause a mixing.

In embodiments of the present disclosure wherein the packaging and dispenser device includes two reservoirs containing starting compositions for mixing together extemporaneously, mixing of the starting compositions may take place outside the device. For example, the starting compositions for mixing may be delivered to the outside via distinct dispensing orifices. These orifices may be located close together to enable the user to receive the dispensed quantities more easily. The starting compositions may come into contact with one another outside the packaging and dispenser device, for example, on a surface from which they are received by the user. In some embodiments consistent with the present disclosure, the device may include two reservoirs with flexible walls, each reservoir having a delivery channel. The delivery channels may deliver starting compositions close to one another, e.g. at a distance apart that is less than or equal to 5 millimeters (mm), e.g. 4 mm.

Figure 9A:
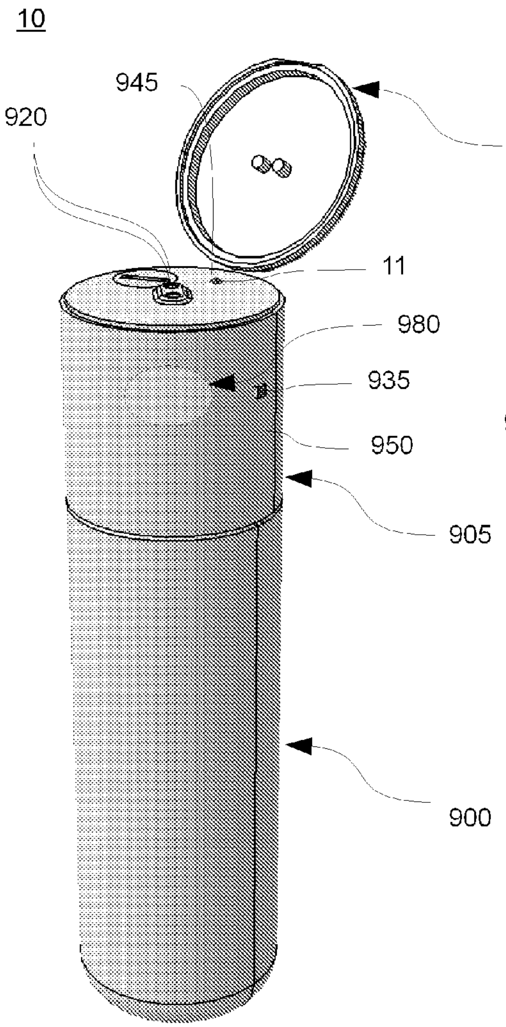
FIGS. 9A-C show another exemplary configuration of systems consistent with the present disclosure.
Figure 9B:
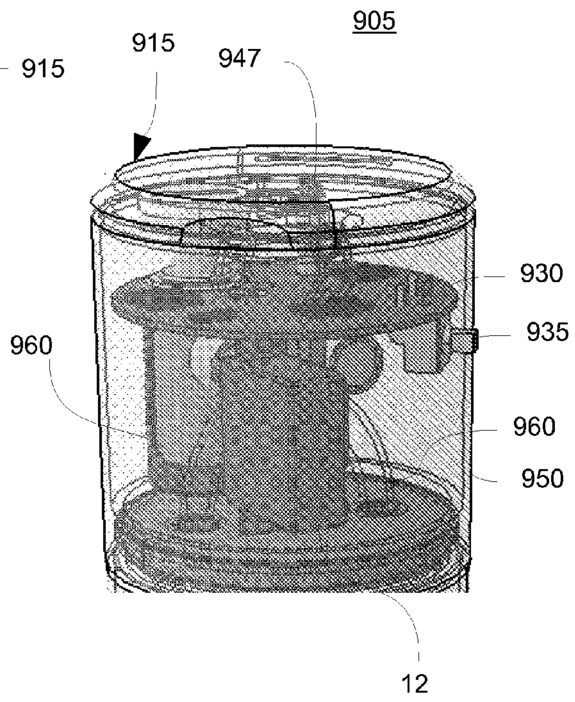

FIG. 9A provides an illustration of yet another exemplary configuration for system 10 consistent with embodiments of the present disclosure, while FIG. 9B provides a translucent illustration of an exemplary configuration of dispenser head 905. System 10 may be configured with a head 905 and a flexible and/or supple container 900. Container 900 may comprise one or more internal dividing walls, resulting in formation of one or more reservoirs within container 900 of desired volumes. Each reservoir may contain a starting composition of similar viscosities, e.g., sun filter creams having different sun protection factors (SPFs). For example, container 900 may be fabricated from a supple plastic material and may be divided into 2 reservoirs by a dividing wall, each reservoir having a volume of 100 ml, the first reservoir containing an SPF 10 sun filter, and the second reservoir containing an SPF 50 sun filter.

Dispenser head 905 be configured to be placed in fluid communication with container 900 (e.g., installed and/or mounted on container 900) such that components of dispenser head 905 may access starting compositions within the reservoirs of container 900, for example via tubes 960 (e.g., supple and of 5 mm diameter). Dispenser head 905 may be reusable and interchangeable with various containers 900. Alternatively, dispenser head 905 may be configured to be used with a single container 900.

Dispenser head 905 may comprise adjustment system 12, a processor, composition orifices 920, and surrounding sensor(s) 11, as one or more components, among other things. For example, dispenser head 905 may comprise a surroundings sensor 11 (e.g., a UV sensor), a circuit board 930, a power source (e.g., battery)(not shown), adjustment system 12, a measurement actuator 935, a closure cap 915, a visual indicator 945 (e.g., an LED), an open indicator 947, and a housing 950.

Figure 9C:
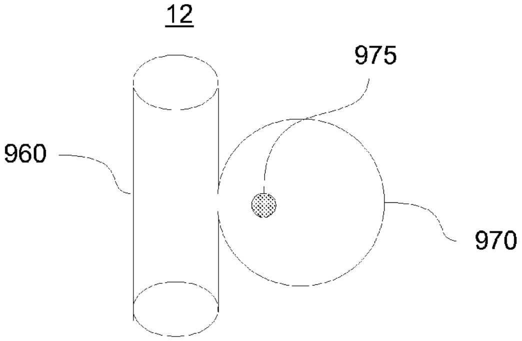

FIG. 9C shows another exemplary configuration according to some embodiments for adjustment system 12. Adjustment system 12 may comprise one or more eccentric wheels 970 in contact with tubes 960 and operably coupled to a shaft 975. While the Shaft 975 may be operably coupled to a motor (e.g., a servo motor) (not shown) configured for rotation over a predefined angle (e.g., 180 degrees). The motor may cause shaft 975, and in turn, eccentric wheel 970 to turn in response to instructions from circuit board 930, thereby resulting in eccentric wheel 970 exerting a pressing force on tube 960, thereby pinching tube 960 to restrict a flow of a starting composition there through. Following such a rotation, the motor, shaft 975, and/or eccentric wheel 970 may be configured to maintain the position last instructed until a new measurement is taken (e.g., actuation of measurement actuator 935 and/or re-opening of cap 915). In other words, adjustment system 12, may remain substantially configured to dispense a similar configuration, even following shutdown of system 10, until a predetermined condition was met (e.g., cap 915 closed and re-opened, measurement actuator 935 actuated, etc.) causing new instructions to be issued via, for example, circuit board 930.

Circuit board 930 may be configured to perform processing functions, and may include a processor and other various circuitry for performing such functions. For example, circuit board 930 may include a board of the printed variety, having various portions (e.g., pins, sockets, etc.) enabling connection of various components (e.g., processors, integrated circuits, etc.) In some embodiments circuit board 930 may comprise a processor of the SX20AC/SS-G variety provided Parallax.

Circuit board 930 may be configured to be in communicative connection with surroundings sensor 11, open indicator 947, adjustment system 12, measurement actuator 935, visual indicator 945, power source 932, and external connections (e.g., RS-232, USB, etc.), among other things. For example, circuit board 930 may receive data from surroundings sensor 11 and may process such data to determine an adjustment to perform using adjustment system 12. Instructions may be generated based on the data and sent from circuit board 930 to adjustment system 12, causing operation of one or more components of adjustment system 12.

Additionally, open indicator 947 may comprise a switch (e.g., a spring loaded switch) or other suitable device, such that when cap 915 is opened, a signal (e.g., a pin voltage change) is sent to circuit board 930 indicating opening of cap 915. Likewise, upon closing cap 915, a signal may again be sent by open indicator 947 indicating such closure. Such an indication may be utilized by circuit board 930 and components thereof to initiate a measurement via, e.g., surroundings sensor 11, to power on or off adjustment system 12, and/or to cause visual indicator 945 to indicate a status associated with system 10 (e.g., red may indicate measuring, yellow may indicate adjusting, green may indicate ready for dispensing, flashing may indicate a low level of starting composition, etc.)

In addition, external connections to circuit board 930 (e.g., RS-232, USB, etc.) may enable programming and re-programming of circuit board 930 and processors associated therewith. For example, a user and/or a technician may connect a terminal (e.g., a laptop computer) or other suitable device to system 10 via a USB cable for purposes of programming the processor. Such programming may include, for example, uploading software, deleting software, modifying adjustment algorithms, etc.

Housing 950 may be configured to house the components associated with dispenser head 905, and may be fabricated from any desired material, based on various consideration such as fashion, functionality, durability, etc. For example, an aluminum housing (e.g., anodized) may be fabricated with preset locations for components of head 905.

Surroundings sensor 11 may be mounted or otherwise located on a surface (e.g., a top surface) of dispenser head 905. Surroundings sensor 11 may be in communicative connection with processor via printed circuit board 930, and may provide data related to the surroundings (e.g., UV light) to processor. In addition, surroundings sensor 11 may be configured, for example, to be active during periods when measurement actuator 935 is actuated, at all times, and/or upon a first opening of closure cap 915, among others.

Cap 915 may be mounted or configured for mounting to dispenser head 905, e.g., on a top of dispenser head 905 and may be, for example, hinged, threaded, snap on, etc. Closure cap 915 may configured to substantially or completely cover the a top surface of dispenser head 905. Surroundings sensor 11 may be substantially covered upon closing closure cap 915. This may aid in preventing dirtying and damage of the UV sensor, among other things (e.g., finger smudges, composition drying, etc.).

In some embodiments, system 10 may further include, for example, one or more valves (not shown) that may be actuated axially and/or via rotation, and/or via any other suitable method. Such valves may be configured to provide functionality similar to closure cap 915, e.g., closure of packaging and dispenser device, open indication etc. For example, system 10 may be provided with a valve configured to be acted on along a longitudinal axis of system 10. Upon opening such a valve (e.g., via a pulling force), open indicator 947 may be actuated to send a signal to circuit board 930 that system 10 should be powered on. Further, preparations may then be enabled to flow from head 905.

EXAMPLE 1

Figure 5:
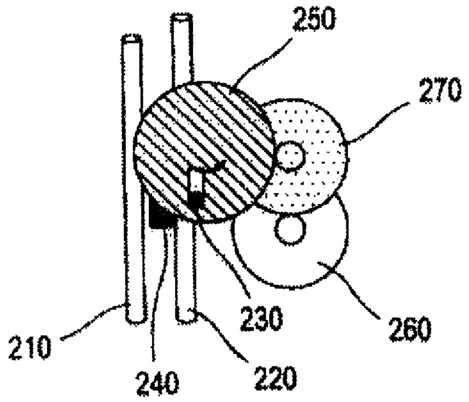

In this example, partially illustrated at FIG. 5, a system 10 includes a packaging and dispenser device having two reservoirs that are connected to two outlet ducts 210 and 220, e.g. two flexible plastic tubes having a diameter of approximately 3 mm and a length of approximately 25 mm.

One of the ducts 210 may be permanently open while the other duct 20 may be selectively opened and closed to a variable extent by a pinch valve including a wire 230, e.g. a piano wire having a section of approximately 1 mm and a length of approximately 3 centimeters (cm). Wire 230 may be positioned in pre-stressed manner so as to flatten the duct against a rigid stationary part 240, e.g. a part that also supports the other duct. The natural elasticity of wire 230 is sufficient to pinch duct 220 at rest so as to prevent the composition from passing therethrough, even when the user presses on the corresponding reservoir.

The other end of wire 230 is engaged in a small toothed wheel 250 having a slot. Wheel 250 may be driven by a motor 260 (e.g., a direct current (DC) motor) and a gear train 270 that may, for example, increase torque delivered by motor 260 in proportion to the current.

When motor 260 is powered, it transmits torque to wheel 250, which pulls on wire 230 and moves it away from the stationary part 240. The higher the current delivered to motor 260, the less wire flattens duct 220, thereby enabling more composition to pass when a pressing force is applied to the second reservoir. When motor 260 is no longer powered, the elasticity of wire 230 returns wire 230 to press again against duct 220, which may cause duct 220 to flatten against stationary part 240.

Energy for delivery of the starting compositions may be provided, for example, by the user pressing on the two flexible reservoirs. In such embodiments, liquid may be substantially prevented from exiting the reservoirs or passing through outlet ducts 220 and 230 unless a pressing force is applied to the reservoir.

Figure 7:
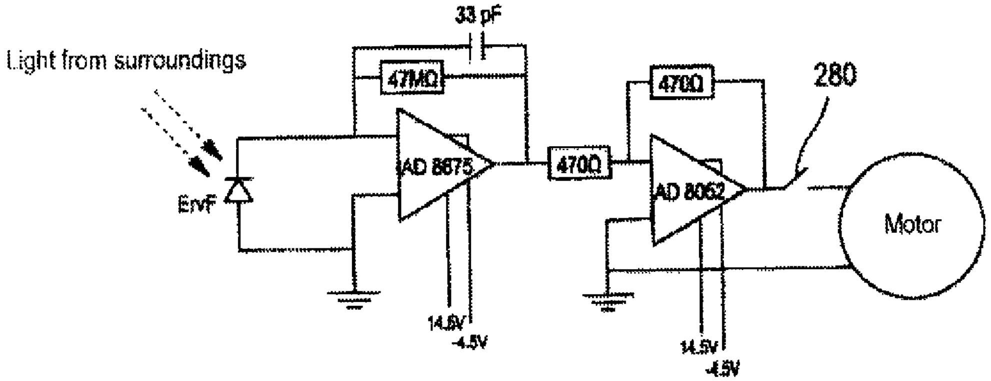
FIG. 7 is an example of an electronic circuit that is suitable for being incorporated in a system according to exemplary embodiments of the present disclosure.

By way of example, a UV sensor, e.g. the sensor referenced EryF from Scitec Instruments, may be used as the surroundings sensor 11, having particular sensitivity to UVB radiation. The UV sensor may be mounted in any suitable location, by any desired method, and in any suitable circuit, for example, a circuit as shown in FIG. 7. FIG. 7 shows an exemplary circuit consistent with embodiments of the present disclosure, wherein the UV sensor is placed on the differential input of an operational amplifier, e.g. AD 8675, in a negative feedback configuration.

Power for the circuit may be supplied by one or more batteries (e.g., two 4.5 volt (V) that are connected in series) and that provide a mid-point that is used as the ground terminal, for example. The operational amplifier may thus deliver a voltage proportional to the solar flux in the spectral band of the detector.

System 10 includes a power amplifier, e.g. AD 8017, AD 8052, etc. that may be connected in a negative feedback configuration and may be configured to power the motor.

A trigger button 280 may be disposed at the output from the power amplifier.

The electronic circuit may be present at any suitable location of the packaging and dispenser device (e.g., in the top portion thereof), with the UV sensor and the trigger button in the present example facing upwards relative to the ground.

A protective and/or closure cap may cover the top of the device, so as to avoid dirtying of the sensors and other components, for example. In such a configuration, closure cap may be configured to be affixed to system 10, so as to close system 10, and/or packaging and dispensing device, substantially or completely from the air, for example to prevent drying or damage. Closure cap may be of any suitable variety, for example, screw on, snap on, hinged, etc.

In the present example, a first reservoir is filled with an emulsion containing 2% sun filter, and the second reservoir with an emulsion containing 30% sun filter.

In this example, system 10 is incorporated within the packaging and dispenser device that is handled by the user (e.g., handheld and portable).

To use system 10, the user removes the protective cap. The user may wait for a time (e.g., at least a few seconds) before using it to allow any sensors to obtain measurements. To deliver the composition, the user may apply a pressing force (e.g., squeeze) to the flexible reservoirs while simultaneously actuating the trigger button (e.g., with a finger of the hand). Thus, the user forces the two starting compositions contained in the reservoirs to flow through the respective outlet ducts.

Once the desired quantity of composition has been dispensed, the user may releases the trigger button.

Depending on the ambient UV light sensed by system 10, and more particularly, by the UV sensor, characteristics of the dispensed preparation, e.g., the mixture of the two starting compositions may vary. For example, the preparation may be rich in UV filter when the sensed light is strong, or low in said active agent when the sensed light is weak or non-existent. Upon a subsequent use the same system 10, the concentrations of the active agent may be different depending on the newly sensed UV light levels.

EXAMPLE 2

The same system as that described in Example 1 is used, the first reservoir being filled with a silicone-oil-based gel emulsion, and the second reservoir with a leave-in cream conditioner, for example, of the para-pentear type.

In daylight, the user removes the protective cap and waits for a time, e.g., a few seconds. The user then applies a pressing force (e.g., squeezes) to the flasks while actuating the trigger button, causing the two starting compositions to flow through the respective outlet ducts.

Depending on the ambient UV light sensed, characteristics of the dispensed preparation may vary, e.g., in concentration of leave-in cream conditioner. For example, where UV light is high, concentration of the conditioner in the delivered preparation may be high relative to the gel emulsion, producing an effect that may protect the color and the quality of the hair, i.e., adapted to a situation in which light levels are high. When UV light sensed is weak, the delivered preparation may be high in gel emulsion relative to the conditioner, providing a conditioner for the hair, and leaving said hair in a desirable state. The effect of protecting the color and the quality of the hair is moderated and adapted to the light situation.

EXAMPLE 3

Figure 6:
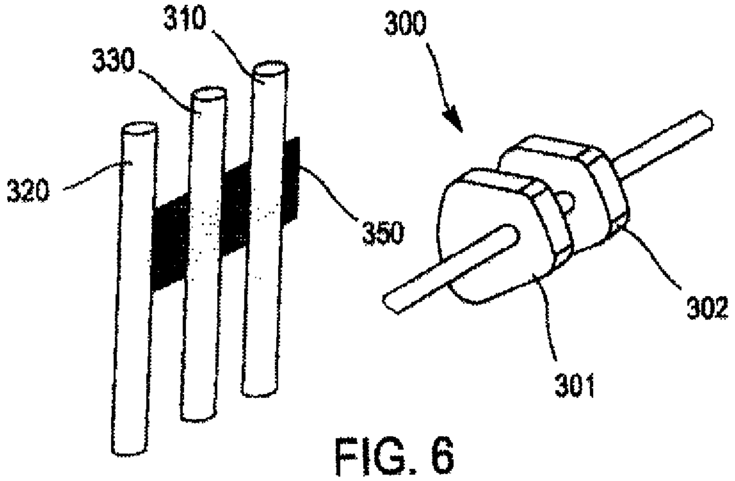

In this example, system 10 includes three flexible-walled reservoirs, and is partially represented at FIG. 6. Each reservoir is provided with a delivery duct 310-330, with each of the three of the ducts opening out, for example, at a spacing of 4 mm from one another. Thus, when the three starting compositions are dispensed, the user may receive a mixture preparation made by these three compositions coming into contact with one another.

In the present example, each duct is formed by a flexible plastic tube having a diameter of 3 mm and a length of 25 mm. Ducts 320 and 330 associated respectively with the second and third reservoirs may be held by a rigid part 350 that is stationary relative to the reservoir.

System 10 may include a pair 300 of cams, in which cams 301 and 302 are offset and located in front of ducts 320 and 330. In a rest position, cams 301 and 302 may compress ducts 320 and 330. When the shaft carrying the cam pair 300 turns, cam 301 may release corresponding duct 320. Thereafter, if the shaft of the cam pair continues to turn, cam 302 may release duct 330.

Energy for delivery of the starting compositions may, for example, be provided by the user delivering pressure by compressing the flexible reservoirs. Thus, starting compositions may be substantially prevented from leaving the reservoirs and/or passing through outlet ducts 310-330 in the absence of a pressure force (e.g., squeezing) to the reservoirs.

In the present example, system 10 includes a surroundings sensor 11 that is a temperature sensor. The temperature sensor may include a contactless temperature sensor, e.g. of the thermopile type as manufactured by Dexter and referenced ST 60. Such a sensor may supply a calibrated signal of the pulse width modulation (PWM) type having a duty ratio that is proportional to temperature, for example. The temperature sensor may be connected directly to a servomotor (not shown) that may be capable of performing, for example, half a revolution depending on the PWM signal. The servomotor may be connected to a power supply, e.g. a 5 V power supply.

A trigger button may be mounted in series between the power supply and the servomotor and the temperature sensor is fastened in any desired location on the packaging and dispenser device, e.g., a top portion of the device.

The first reservoir may be filled with a neutral gel, the second reservoir with a gel containing 20% glycerin, and the third reservoir with a gel containing 20% glycerin and 15% UV filter.

To use system 10, the user removes the protective cap and actuates the trigger button. After an amount of time, e.g., a few seconds, the user squeezes the flask while pressing on the trigger button, forcing the three starting compositions to flow through the respective outlet ducts.

When the temperature is moderate (e.g., 20° C.), the liquid in the first reservoir may be delivered via the duct 310 without adding contents from the second and third reservoirs. When the temperature is higher (e.g., 30° C. to about 40° C.), the servomotor turns the shaft carrying cams 301 and 302 through a desired rotation, e.g., about one fourth of a turn. Cam 301 releases duct 320 associated with the second reservoir, resulting in delivery of a preparation comprising contents from the first and second reservoirs. Such a preparation may contain, for example, about 10% glycerin, thereby providing a care product for the skin that is adapted to the ambient temperature.

In the event of even higher temperature (e.g., 40° C. or higher), the servomotor turns the shaft carrying the cams 301 and 302 through a desired rotation, e.g., about one half of a turn. Cams 301 and 302 then release both of the associated ducts 320 and 330 resulting in delivery of a preparation comprising content from all three reservoirs. Such a mixture may contain, for example, about 16% glycerin and 5% sun filter, providing a care product for the skin that is adapted to the ambient temperature.

In some embodiments, the shape of the cams may be advantageously selected so as to release the outlet ducts progressively, thereby enabling the device to produce mixtures with intermediate formulations.

EXAMPLE 4

In this example, system 10 includes two flexible-walled reservoirs containing starting compositions. Each reservoir is provided with a delivery duct opening out, for example, at a spacing of 4 mm from each other. Thus, when starting compositions are dispensed, the user may receive a preparation comprising a mixture of the two starting compositions.

By way of example, one of the ducts is formed by a flexible plastic tube having a diameter of 3 mm and a length of 25 mm, and the other by a flexible plastic tube having a diameter of 3 mm and a length of 55 mm.

Figure 8:
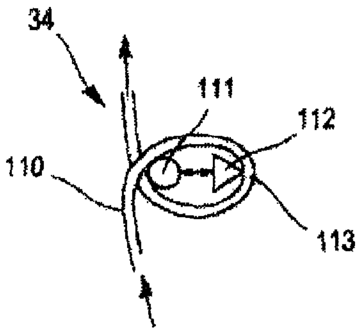
FIGS. 4 to 6 and 8 are fragmentary and diagrammatic views of exemplary adjustment systems consistent with embodiments of the present disclosure.

A partial illustration of the present example is provided at FIG. 8, showing system 10 including a pinch valve acting on one of the ducts 110, held on one side by a stationary part 111 and on the other by a movable part 112 of triangular section.

A spring pushes movable part 112 towards duct 110. Pinching is such that the flow of composition via the duct is at a minimum.

The movable part may be moved by means of a motor, e.g. a stepper motor under the Performax trademark. When the motor starts to move, movable part 112 moves away from duct 110. As a result, the further movable part 112 moves away from duct 110, the greater the rate at which starting composition passes through duct 110.

Energy for delivering the starting compositions may be provided by, for example, a pressing force applied to (e.g., squeezing) the two reservoirs.

In this example, a UV sensor, e.g. a broadband UV probe referenced as part number UV_Air_ABC_AMP0-5V_plug from Scitec Instruments, is provided for surroundings sensor 11. By means of an amplifier incorporated therein, the sensor delivers a signal lying in the range 0 to 5 V depending on the intensity of the sensed UV light. System 10 may then control the stepper motor as a function of the signal delivered by the UV sensor.

In this example, the UV sensor is adhesively bonded on the top of the packaging and dispenser device and connected to the stepper motor and battery provides power to the sensor and the motor.

A protective cap covers the top of the device, so as to avoid dirtying or damage to the UV sensor. A trigger-button switch makes it possible to switch on the circuit of the device.

The first reservoir may be filled with an emulsion containing 2% sun filter, and the second reservoir with an emulsion containing 30% sun filter.

In daylight, the user removes the protective cap and actuates the trigger button.

After an amount of time to obtain UV measurements (e.g., a few seconds), the user applies a pressing force on the flask, causing the starting compositions of the reservoirs to be dispensed through respective ducts. Depending on the ambient UV light sensed by the UV sensor, characteristics of the dispensed preparation, e.g., concentrations of the starting components, may vary. For example, the mixture dispensed is rich in active agent (i.e., sun filter) if the light is strong, and poor in active agent if the UV light is weak or non-existent.

EXAMPLE 5

For this example, the same system as that described in Example 4 is used.

The first reservoir is filled with a shampoo that does not contain sun filter, and the second reservoir with a leave-in cream conditioner containing 20% sun filter.

In daylight, the user removes the protective cap and actuates the trigger button.

After an amount of time to obtain UV measurements, e.g., few seconds, the user squeezes the reservoirs, forcing their content to flow out.

Depending on the ambient UV light sensed, characteristics of the dispensed preparation may vary. For example, rich in active agent if the light is strong, or poor in active agent if the light is weak or non-existent.

EXAMPLE 6

The same system as that described in Example 4 is used, except that the surroundings sensor 11 is a humidity sensor, e.g. as manufactured by Honeywell.

The sensor controls the stepper motor of adjustment system 12.

The first reservoir with a gel containing 40% glycerin and the second reservoir is filled with a gel that does not contain moisturizing compound.

Depending on the humidity sensed, characteristics of the dispensed preparation, e.g., concentrations of the two gels may vary. For example, rich in glycerin if the humidity is low, and poor in glycerin if the humidity is high.

EXAMPLE 7

In this example, system 10 is configured to receive data from its surroundings related to UV exposure, and optionally, skin type, among others, via a UV sensor as surroundings sensor 11. One exemplary configuration for this example includes FIGS. 9A-C as described above.

For this example, the packaging and dispenser device includes two reservoirs containing starting compositions 20$_i$, one of which is a 10 SPF sun filter and the other is a 50 SPF sun filter (e.g., sun crèmes). Each of the sun filters may be configured with a similar viscosity. In some embodiments, a value associated with such viscosity may be such that the sun filters are configured to flow readily (e.g., within 10 seconds when a force equivalent to gravity is applied). In addition the packaging and dispenser device is provided with a UV sensor, e.g., PDU-GS106B-SM UVB detector from Advanced Photonics and a processor based on the SX20AC/SS-G from Parallax. The packaging and dispenser device may further include two or servo motors, e.g., S3107 from Futaba, for dispensing the starting compositions based on instructions from the processor.

The UV sensor may be located at any suitable location on the packaging and dispenser device, and for purposes of this example, was located on a top portion.

To operate, the user may open the closure cap causing an open indication to be sent to the processor (e.g., via a change in pin voltage). A visual indicator may light, for example, a red color, to indicate that the user may allow time (e.g., a few seconds) for the sensors to obtain measurements of, for example, ambient UV light. Upon obtaining a reading and performing an adjustment, a visual indicator may light, for example, a green color, to show that the packaging and dispenser device is ready to dispense a preparation.

To deliver the preparation, the user may squeeze the reservoirs, which may be flexible, while pressing with a finger on the trigger/measurement button, alternatively, no pressing of trigger/measurement button may be performed to enable dispensing. Data received at the UV sensor (i.e., regarding UV light flux) may be provided to the processor to determine a desirable SPF in view of the current UV light flux where the packaging and dispenser device is located. For example, based on the data provided, the processor may calculate, using, for example, a linear function, an amount of each of the starting compositions (e.g., 10 SPF and 50 SPF creams) to be dispensed together to render a desired SPF in view of the measured UV light.

In such an embodiment, in areas where data indicates a high level of UV light flux, substantially most or all of the cream dispensed may be 50 SPF cream to provide the desired protection. Similarly, where the data indicates a low level of UV light flux, substantially most or all of the cream dispensed may be 10 SPF cream may be provided, to provide only the protection desired. Based on the data, characteristics of the dispensed preparation, e.g., the SPF of the dispensed preparation may be varied between 10 SPF and 50 SPF as desired via instruction of the processor to the servo motors. Thus, the concentration of the sun filter may be modified and/or optimized to provide desired protection against the sun. Table 1 shows exemplary dispensation data from each reservoir based on output from the UV sensor.

TABLE 1

| W/m$^2$ (UV A-B) | % Preparation from First Reservoir | % Preparation from Second Reservoir |
|---|---|---|
| 0-40 | 100 | 0 |
| 40-80 | 100 | 0 |
| 80-120 | 90 | 10 |
| 120-160 | 75 | 25 |
| 160-200 | 60 | 40 |
| 200-240 | 45 | 55 |
| 240-280 | 30 | 70 |
| 280-320 | 15 | 85 |
| 320-360 | 5 | 95 |
| 360-400 or more | 0 | 100 |

In embodiments including data related to a skin type, system 10 may take into account skin type and/or color in determining what concentration of sun filters to provide. For example, for a darker skinned user, it may be desirable to provide a lower SPF to allow natural sun protection (e.g., melanin) to assist in the protective process. Likewise, a lighter skinned user may desire additional SPF to compensate for lack of natural sun protection.

The present disclosure is not limited to the examples described above. For example, the implementation characteristics of the various embodiments may be combined together in variants that are not shown.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific measurement values for described elements should be understood to be within generally accepted manufacturing or industry tolerances, and any use of the terms substantially and/or approximately should be understood to mean falling within such generally accepted tolerances.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A cosmetic or dermatological system, comprising:

a packaging and dispenser device containing one or more starting compositions from which a preparation to be dispensed is prepared;

a surroundings sensor configured to provide information associated with a physical magnitude of an environment surrounding the system;

an adjustment system that is coupled to or configured for coupling to the packaging and dispenser device, and that enables at least one characteristic of the preparation to be varied; and a processor for automatically controlling the adjustment system based on the information and/or for informing a user about an action to be exerted on the adjustment system based on the information.

2. The system according to claim 1, the system being configured to automatically vary the at least one characteristic of the preparation based on a function of the information provided by the surroundings sensor.

3. The system according to claim 1, the system being configured to vary the concentration of at least one active agent in the preparation based on a function of the data provided by the surroundings sensor.

4. The system according to claim 1, the packaging and dispenser device having a first reservoir containing a first composition and a second reservoir containing a second composition, the first and second compositions for mixing together to form the preparation, the adjustment system acting based on a function of at least data provided by the surroundings sensor, to modify the ratio of one composition relative to the other in the preparation.

5. The system according to claim 1, the device having two reservoirs, each of the two reservoirs containing different compositions, the adjustment system being configured to cause dispensing of one of the compositions selectively.

6. The system according to claim 4, at least one of the first and second compositions containing a sun protection filter.

7. The system according to claim 1, the physical magnitude comprising at least one of an intensity of UV radiation, a temperature, and a pressure of the atmosphere.

8. The system according to claim 1, wherein energy for dispensing the preparation is provided by the user exerting an action on the packaging and dispenser device.

9. The system according to claim 8, wherein the action comprises pressing on a wall of the packaging and dispenser device.

10. The system according to claim 1, the packaging and dispenser device comprising one or more removable reservoirs, each of the one or more removable reservoirs containing one or more compositions.

11. The system according to claim 1, further comprising a user interface enabling the user to provide an input, the input comprising at least one of a skin type, a hair type, an age, and an activity, wherein the adjustment system is manipulated based on the input.

12. The system according to claim 1, the adjustment system comprising a pinch valve.

13. The system according to claim 1, the adjustment system comprising at least one rotary cam and/or eccentric wheel.

14. The system according to claim 1, further comprising an activation chamber configured to expose a deactivated active agent to a stimulus so as to cause the deactivated agent to pass into an activated state.

15. The system according to claim 1, wherein the adjustment system is configured to maintain an adjustment following dispensing of the preparation.

16. The system according to claim 15, wherein the adjustment is maintained until additional information from the surroundings sensor is received by the processor.

17. The system according to claim 1, further comprising a closure cap.

18. The system according to claim 17, wherein the closure cap is configured to substantially cover at least a top portion of the packaging and dispenser device.

19. The system according to claim 17, wherein the closure cap is configured to actuate a switch.

20. The system according to claim 19, wherein actuation of the switch causes a signal to be sent to the processor indicating a cap open or a cap closed status.

21. The system according to claim 1, further comprising a system status indicator.

22. The system according to claim 21, wherein the system status indicator comprises an LED.

23. The system according to claim 21, wherein the system status indicator is configured to indicate at least one of the following statuses, a ready to dispense status, an obtaining surroundings data status, and a composition level low status.

24. The system according to claim 4, wherein the first and second reservoirs comprise a flexible or supple material.

25. The system according to claim 4, wherein the first and second reservoirs are formed by a container having at least one internal dividing wall.

26. The system according to claim 1, wherein the processor is programmed to determine an adjustment based on a linear relationship with a voltage provided by the surroundings sensor.

27. The system according to claim 1, wherein the packaging and dispenser device comprises a head unit and a body unit.

28. The system according to claim 27, wherein the head unit is at least one of detachable and reusable.

29. The system according to claim 27, wherein the body unit comprises the one or more starting compositions.

30. The system according to claim 27, wherein the head unit comprises at least one of the adjustment system and the processor.

31. The system according to claim 1, wherein at least one of the system and the packaging and dispenser device is hand held.

32. The system according to claim 1, further comprising a measurement actuator.

33. The system according to claim 32, wherein the measurement actuator is configured to cause operation of at least one of the processor and the surroundings sensor to obtain the information.

34. A method of dispensing a cosmetic or a skin product using the system according to claim 1, the method comprising:

automatically or semi-automatically modifying characteristics of the adjustment system, based on the information.

35. The method according to claim 34, further comprising opening a closure cap and/or actuating a valve to cause operation of at least one of the surroundings sensor and the processor.

36. A cosmetic or dermatological system comprising:

a handheld packaging and dispenser device containing one or more starting compositions from which a preparation to be dispensed is prepared;

a surroundings sensor configured to provide information associated with a physical magnitude of an environment surrounding the system;

an adjustment system that is coupled to or configured for coupling to the packaging and dispenser device, and that enables at least one characteristic of the preparation to be varied; and a processor configured to automatically manipulate the adjustment system based on the information and/or for informing a user about an action to be exerted on the adjustment system based on the information.

37. The system according to claim 36, wherein the one or more starting compositions comprise a first composition having a first sun protection factor, and a second composition having a second sun protection factor.

38. The system according to claim 37, wherein the first sun protection factor is 10 and the second sun protection factor is 50.

39. The system according to claim 37, further comprising a body characteristic sensor and/or a user interface configured to receive information about a body characteristic.

40. The system according to claim 39, wherein the body characteristic comprises at least one of a skin color, a hair color, and a skin moisture level.

41. The system of claim 39, wherein the processor is further configured to manipulate the adjustment system based on data from the body characteristic sensor.

* * * * *